United States Patent [19]
Williams

[11] Patent Number: 5,388,918
[45] Date of Patent: Feb. 14, 1995

[54] SPLIT BEARING CAGES

[75] Inventor: Reginald Williams, Wolverhampton, England

[73] Assignee: The Torrington Company, Torrington, Conn.

[21] Appl. No.: 143,962

[22] Filed: Nov. 1, 1993

[30] Foreign Application Priority Data

Aug. 2, 1993 [GB] United Kingdom ............... 9316804

[51] Int. Cl.$^6$ ............................................. F16C 33/46
[52] U.S. Cl. ................................... 384/530; 384/523
[58] Field of Search ...................... 384/523–534, 384/572–580, 51, 470, 614

[56] References Cited

U.S. PATENT DOCUMENTS

| | | | |
|---|---|---|---|
| 654,375 | 7/1900 | Wilson | 384/523 |
| 1,067,685 | 7/1913 | Schmid-Roost . | |
| 1,767,407 | 6/1930 | Simmons . | |
| 1,780,189 | 11/1930 | Hodge . | |
| 2,013,123 | 9/1935 | Baker | 384/574 |
| 2,018,701 | 10/1935 | Bott | 384/527 |
| 2,267,708 | 12/1941 | Cox | 384/574 |
| 3,313,582 | 4/1967 | Hubbell . | |
| 3,471,208 | 10/1969 | Vannest . | |
| 3,649,093 | 3/1972 | Muratore et al. . | |
| 4,451,098 | 5/1984 | Farley et al. . | |
| 4,558,961 | 12/1985 | Fernlund | 384/526 |
| 4,568,206 | 2/1986 | Imazaike | 384/530 |
| 4,626,113 | 12/1986 | Forknall et al. | 384/530 |
| 4,732,496 | 3/1988 | Shail | 384/526 |
| 4,902,145 | 2/1990 | Johnson | 384/530 |
| 5,131,762 | 7/1992 | Waskiewicz | 384/448 |

FOREIGN PATENT DOCUMENTS

| | | | |
|---|---|---|---|
| 616467 | 9/1935 | Germany | 384/523 |
| 2243502 | 3/1974 | Germany | 384/578 |
| 2836399 | 3/1979 | Germany | 384/579 |

Primary Examiner—Thomas R. Hannon
Attorney, Agent, or Firm—John C. Bigler

[57] ABSTRACT

A split bearing cage assembly comprising two cage parts assembled and held together by means of components in the form of dowels (3) extending through and located in apertures through both cage parts. The apertures are located and aligned such that, when the dowels are inserted into the apertures, the relative alignment between the dowels is such as to present resistance to the separation of the two cage parts so assembled. The apertures can be straight drilled holes and the dowels can be aligned so as to lie on the surface of a cone.

11 Claims, 1 Drawing Sheet

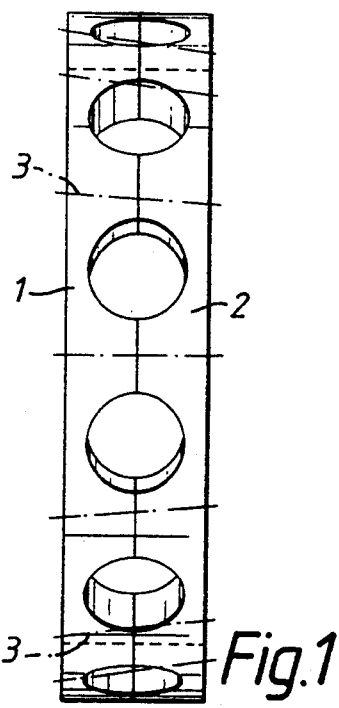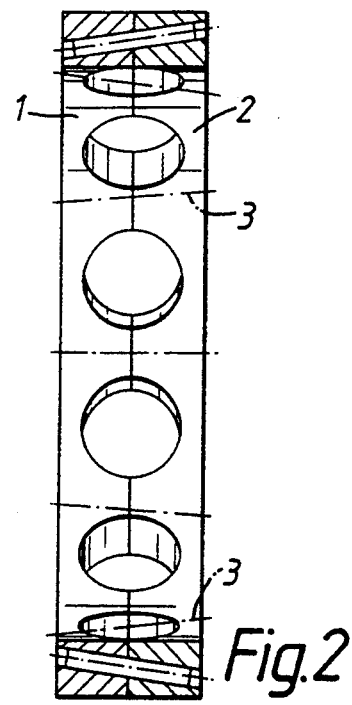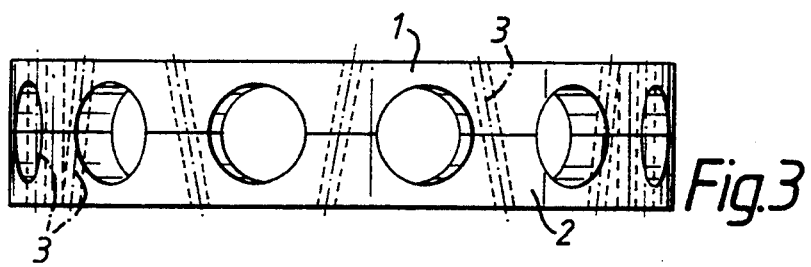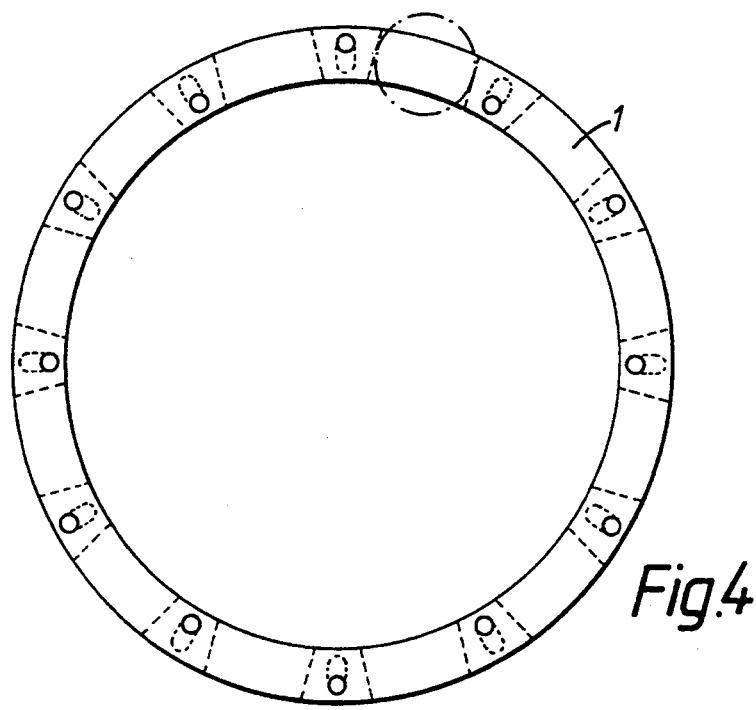

SPLIT BEARING CAGES

BACKGROUND OF THE INVENTION

This invention relates generally to bearing cages and, more particularly, to split bearing cages comprising two parts fixed together.

Bearing cages which are used to space rolling elements in bearings are often made in two parts to enable bearing assembly. Fixing the two parts together within the bearing must be done with all the rolling elements in place between the inner and outer raceways.

A common means of fixing together the two parts of the bearing cage is by riveting through predrilled holes. Space must be provided to accommodate the rivet heads, usually on both sides of the bearing cage. Countersunk rivets can be used but require extra machining operations to prepare the fixing holes.

Limited access can present a problem to riveting, which is usually accomplished by a cold-roll or hot-squeeze process to form the head so as to avoid the bearing damage which would be caused by the alternative percussion means. The quality of the riveting must be such that the two cage parts are properly pulled together, thus making hot riveting favored so that contraction in cooling exerts a pull.

Dismantling the bearing for service or refurbishment requires the difficult removal of the rivets and the possibility of damage to the cage.

The foregoing illustrates limitations known to exist in present bearing cages. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a split bearing cage comprising two cage parts assembled held together by means of components extending through and located in apertures through both cage parts. The apertures are located and aligned such that, when the components are inserted into the apertures, the relative alignment between at least two of said components is such as to present resistance to the separation of the two cage parts so assembled.

The foregoing and other aspects will become apparent from the following detailed description of the invention when considered in conjunction with the accompanying drawing figures.

BRIEF DESCRIPTION OF THE DRAWING FIGURES

FIG. 1 is a side view of a split bearing cage illustrating an embodiment of the present invention;

FIG. 2 is a cross sectional view of a split bearing cage illustrating a second embodiment of the present invention;

FIG. 3 is a side view of a split bearing cage illustrating a third embodiment of the present invention; and FIG. 4 is an end view showing the face of the split bearing cage of FIG. 2.

DETAILED DESCRIPTION

Referring now to the drawings, FIGS. 1 through 4 show various forms of split bearing cages with different dowel misalignment, which provide for different cage proportions, aspect ratio, weight of rim and space available between cage pockets, each illustrating an embodiment of the split bearing cage of the present invention.

FIG. 1 shows cage parts 1 and 2 and dowels, having positions indicated by chain-dot lines 3, with their centers when projected all converging at one point on the center line of the cage. That is, the dowels lie on the surface of a cone. This is the most convenient arrangement of the present invention for cages with an odd number of pockets. Dowels at either end of the maximum chord have the largest misalignment to each other, and adjacent dowels have the least misalignment to each other.

FIG. 2 shows an arrangement similar to FIG. 1 except that some of the components lie on the surface of one cone and others of the components lie on the surface of another cone. More particularly, alternate dowels lie on the first cone and the remaining dowels lie on a second similar cone projecting in the opposite direction. This arrangement presupposes an even number of pockets. This arrangement would be most suitable for large flexible cages.

FIG. 4 shows a view of the end face of the cage shown in FIG. 2.

FIG. 3 indicates dowels 3, not on the surface of a cone, but tangential to a helix on a cylinder of the pitch circle diameter. The dowels are evenly spaced but alternate dowels are tangential to an opposite-hand helix. This arrangement is suitable for cage sections of small radial depth and also presupposes an even number of pockets.

Only three possibilities are described although any pattern of misalignment is suitable to varying degrees, provided the dowels are not parallel to each other. The various forms present different opportunities for the drilling of the holes, none of which requires more than a tilted version of current indexing machining fixtures. The two cage parts 1, 2 are clamped together during the mutual drilling operation so that this clamped position is repeated when the bearing is assembled.

The type of dowel used can be selected, according to the particular application, from plain dowels, spring roll-pins, drive screws, thread-forming screws and others. Whatever means is selected, the drilled hole diameter must be filled so as to avoid lateral movement and to retain the fixing device within the hole. For instance, a rivet is unsuitable because it would not only be loose within the hole but could fall out unless lightly peened.

Of the alternative fixings given, the headless varieties can be driven straight through when dismantling the bearing for refurbishment. Headed varieties must be removed in the opposite direction to that in which they were driven; unscrewed using a slotted head, or driven out from the opposite side in the case of the drive screw. In either case, the head is used only for driving in and/or out and does not contribute to the holding power of the fixing.

The figures show the skew-fixing of cages for ball bearings. Of course the principle can also be applied to bearings with different rolling elements; rollers for instance. Cages for these other bearings are unlikely to be divided into two equal-width parts and the easy distortion of the hole drilled in the thinner part needs to be considered. A headed fixing could be used in these circumstances but the angle of the head to the surface of the narrower part should be realized.

From the above, it should be apparent that the present invention provides an improved split bearing cage held together by components extending through apertures in both cage parts. The relative alignment between the components ensures resistance to separation of the two parts. Preferably, the components are dowels, misaligned one from another and located in straight drilled holes, thus singly and collectively providing shear resistance to separating of the cage parts. The greater the angle of misalignment, the larger the component of shear.

Having described the invention, what is claimed is:

1. A split bearing cage comprising two cage parts assembled and held together such that pockets for receiving rolling elements are formed therebetween, the two cage parts being held together by means of components extending through and located in apertures through both cage parts, said apertures being located between said pockets and aligned at an angle with respect to each other such that, when said components are inserted into said apertures, the relative alignment between at least two of said components is such as to present resistance to the separation of the two cage parts so assembled.

2. A bearing comprising a split bearing cage according to claim 1 and being in the form of a ball bearing.

3. A bearing comprising a split bearing cage according to claim and being a roller bearing.

4. A split bearing cage according to claim 1, wherein said components are dowels.

5. A split bearing cage according to claim 4, wherein said dowels are in the form of spring roll-pins.

6. A split bearing cage according to claim 4, wherein said dowels are in the form of drive screws.

7. A split bearing cage according to claim 4, wherein said dowels are in the form of thread forming screws.

8. A split bearing cage according to claim 1, wherein said apertures are straight drilled holes.

9. A split bearing cage according to claim 1, wherein imaginary projections of said components when assembled converge at one point on a center line of the cage.

10. A split bearing cage comprising two cage parts assembled and held together by means of components extending through and located in apertures through both cage parts, said apertures being located and aligned such that, when said components are inserted into said apertures, the relative alignment between at least two of said components is such as to present resistance to the separation of the two cage parts so assembled, wherein the alignment of some of said components is such that they lie on the surface of a cone extending in one direction and others of said components lie on the surface of another cone extending in the opposite direction to the firstmentioned cone.

11. A split bearing cage comprising two cage parts assembled and held together by means of components extending through and located in apertures through both cage parts, said apertures being located and aligned such that, when said components are inserted into said apertures, the relative alignment between at least two of said components is such as to present resistance to the separation of the two cage parts so assembled, wherein said components are arranged when assembled to be tangential to a helix on a cylinder of the pitch circle diameter, with the components being evenly spaced but alternate components being tangential to an opposite-hand helix.

* * * * *

UNITED STATES PATENT AND TRADEMARK OFFICE
CERTIFICATE OF CORRECTION

PATENT NO. : 5,388,918
DATED : February 14, 1995
INVENTOR(S) : Reginald Williams It is certified that error appears in the above—identified patent and that said Letters Patent is hereby corrected as shown below:

On the title page, item [30]:

[30] Foreign Application Priority Data, should read---

Aug. 12, 1993 [GB] United Kingdom . . . . 9316804 --

Signed and Sealed this

Ninth Day of May, 1995

BRUCE LEHMAN

*Attest:*

*Attesting Officer*  *Commissioner of Patents and Trademarks*